(12) United States Patent
Kopko

(10) Patent No.: US 6,308,512 B1
(45) Date of Patent: Oct. 30, 2001

(54) SUPERCHARGING SYSTEM FOR GAS TURBINES

(75) Inventor: William L. Kopko, Springfield, VA (US)

(73) Assignee: Enhanced Turbine Output Holding, LLC, Springfield, VA (US)

( * ) Notice: Subject to any disclaimer, the term of this patent is extended or adjusted under 35 U.S.C. 154(b) by 0 days.

(21) Appl. No.: 09/388,927

(22) Filed: Sep. 2, 1999

Related U.S. Application Data
(60) Provisional application No. 60/138,848, filed on Jun. 10, 1999, and provisional application No. 60/139,894, filed on Jun. 22, 1999.

(51) Int. Cl.[7] ................................................ F02G 3/00
(52) U.S. Cl. .............................. 60/39.03; 60/726; 60/728
(58) Field of Search ............................... 60/39.03, 39.29, 60/728, 726

(56) References Cited

U.S. PATENT DOCUMENTS

| | | | |
|---|---|---|---|
| 2,584,232 | 2/1952 | Sedille . | |
| 3,394,265 | 7/1968 | Hendrickson . | |
| 3,500,636 | * 3/1970 | Craig | .................................. 60/39.03 |
| 3,796,045 | 3/1974 | Foster-Pegg . | |
| 4,731,990 | * 3/1988 | Munk | .................. 60/39.05 |
| 5,353,585 | 10/1994 | Munk . | |
| 5,537,813 | 7/1996 | Davis et al. . | |
| 5,622,044 | 4/1997 | Bronicki et al. . | |
| 5,655,373 | 8/1997 | Yamashita et al. . | |
| 5,669,217 | 9/1997 | Anderson . | |
| 5,675,188 | 10/1997 | Utamura . | |
| 5,680,752 | * 10/1997 | Skog | ....................... 60/726 |
| 5,782,093 | 7/1998 | Yamashita et al. . | |

OTHER PUBLICATIONS

Foster–Pegg R.W., "Supercharging of Gas Turbines by Forced Draft Fans with Evaporative Intercooling", American Society of Mechanical Engineers, Jan. 7, 1965, pp. 1–12.

Foster–Pegg, R.W., "Trends in Combined Steam–Gas Turbine Power Plants in the U.S.A.", Transactions of the ASME Journal of Engineering for Power, Oct. 1966, pp. 302–312.

Kolp, D.A., "Advantages of Air Conditioning and Supercharging an LM6000", Transactions of the ASME Journal of Engineering for Gas Turbines and Power, vol. 117, Jul. 1995, pp. 513–527.

* cited by examiner

*Primary Examiner*—Charles G. Freay
(74) *Attorney, Agent, or Firm*—Rothwell, Figg, Ernst & Manbeck

(57) ABSTRACT

A supercharger for improving performance of a gas-turbine power plant at high ambient temperatures. The supercharger comprises an auxiliary fan that can pressurize air before it enters the gas turbine and means for limiting turbine power output at lower ambient temperatures. The means for limiting turbine power may include control over supercharging pressure, gas-turbine inlet air temperature, or burner exit temperature. The supercharger preferably also comprises cooling means located in the air stream between the auxiliary fan and the inlet to the turbine. The air cooler is preferably a direct evaporative cooler, but could also be an indirect evaporative cooler, a cooling coil with associated mechanical or absorption refrigeration system, etc. The supercharger may also include a bypass damper that allows air to move freely around the auxiliary fan when the fan is not operating. This supercharger is especially suitable for retrofit on existing gas-turbine power plants.

24 Claims, 8 Drawing Sheets

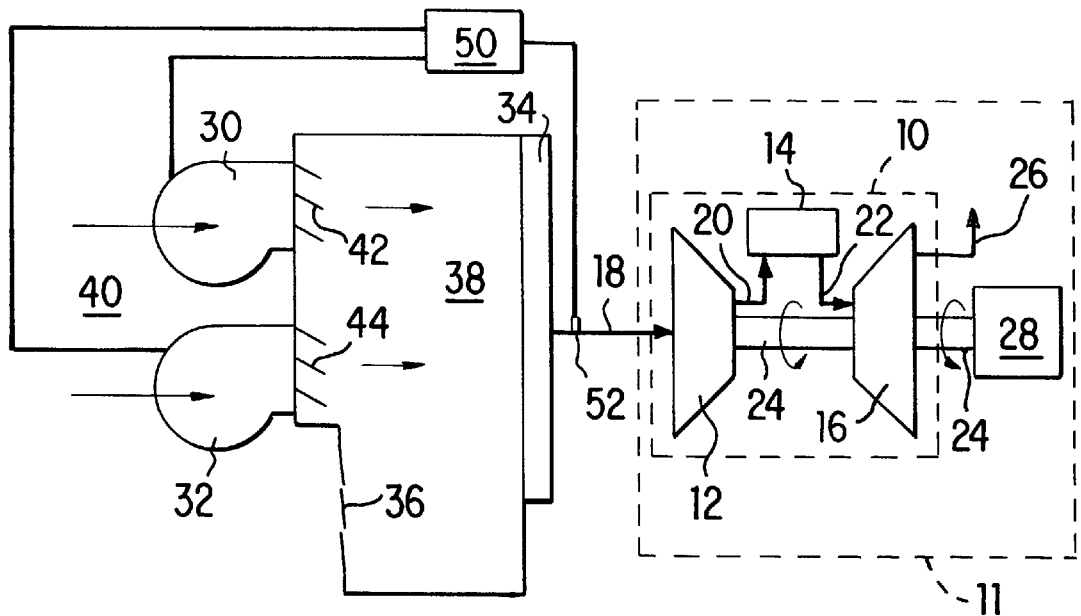
FIG. 1A
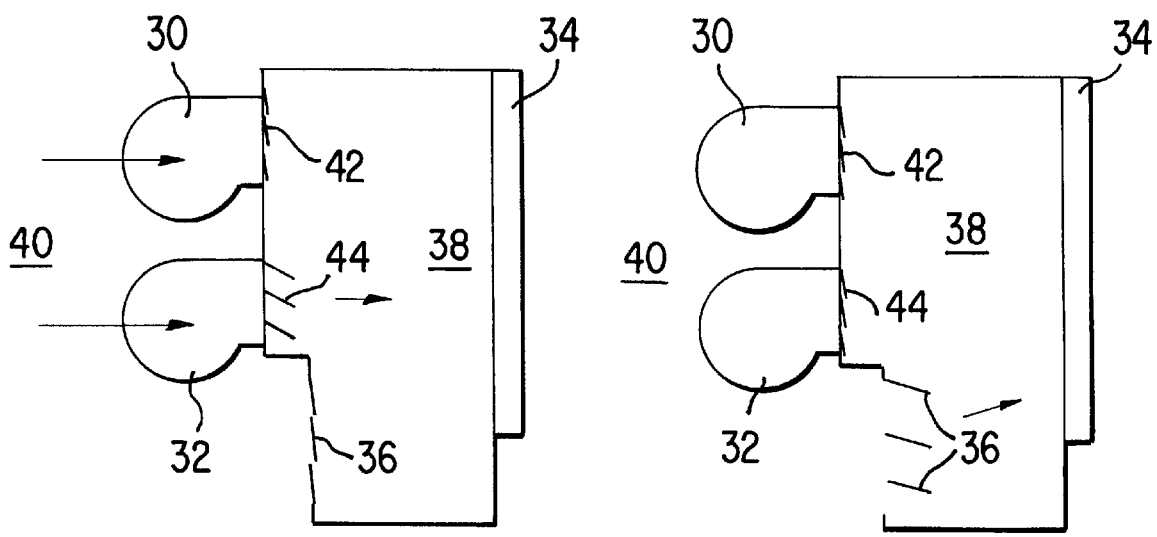
FIG. 1B
FIG. 1C

SUPERCHARGING SYSTEM FOR GAS TURBINES

Applicant claims the benefit of copending U.S. provisional patent application Serial No. 60/138,848 filed Jun. 10, 1999 and Ser. No. 60/139,894 filed Jun. 22, 1999.

BACKGROUND OF THE INVENTION

1. Field of the Invention

This invention relates generally to gas turbine power generation systems and more particularly relates to a supercharging system for improving the capacity of gas-turbine power plants at high ambient temperatures. Specifically, the system uses an auxiliary fan combined with a controller to pressurize inlet air to the turbine to allow operation with existing turbines; the auxiliary fan is preferably combined with an inlet air cooling system.

2. Background and Prior Art

It has long been recognized that the capacity of gas turbines declines with increasing inlet air temperature. The typical penalty is on the order of 0.4% per degree F. This characteristic is especially troublesome for gas turbines used in electrical power generation since the peak electricity demand usually coincides with the highest ambient air temperatures. Gas turbines and associated generators and power distribution systems are usually rated based on turbine capacity at 40 to 50° F. inlet air temperature. This low rating temperature means that the capacity reduction at summer-peaking conditions can amount to approximately 20 to 40% of turbine capacity, depending on the design, local weather conditions, and the characteristics of the particular turbine.

Many different approaches for cooling inlet air to the turbine in order to reduce or eliminate this capacity penalty are known in the prior art. A summary of these approaches is described in the ASME paper, "Options in Gas Turbine Power Augmentation Using Inlet Air Chilling," Igor Ondryas et al., presented at the Gas Turbine and Aeroengine Congress and Exposition, Jun. 11–14, 1990, Brussels, Belgium. Among the alternatives for cooling are direct and indirect evaporative cooling, electric vapor-compression, absorption, and thermal storage systems.

Of these many alternatives, direct evaporative cooling is the only approach that has seen any significant commercial application. Direct evaporative cooling has the advantage of low cost and simplicity, but the ambient wet-bulb temperature limits the possible temperature reduction. For locations in the eastern U.S. direct evaporative cooling can reduce inlet air temperatures by 10 to 20° F., depending on the local climate. Larger reductions are possible in warm, dry climates such as those of the southwestern U.S. While direct evaporative cooling is helpful, it does not allow the turbines to run at their full design capacity. After over 50 years of intensive research and development in gas turbines, a better approach for dealing with high ambient temperatures has not been produced.

An interesting but virtually unused approach to address these problems is described in the paper, "Supercharging of Gas Turbines by Forced Draft Fans With Evaporative Intercooling" by R. W. Foster-Pegg, ASME 1965. This paper describes the use of a high-pressure fan to increase the inlet pressure to a gas turbine combined with an evaporative cooler downstream of the fan as a way of increasing turbine capacity, This approach can give large theoretical advantages, but it required special sizing of the generator which limited its use to new turbines. In addition the systems used a single fan with inlet vanes for control purposes, which reduced the efficiency of the system.

Kolp et al. show the economics of the supercharging and cooling systems in the ASME paper "Advantages of Air conditioning and supercharging an LM6000 Gas Turbine Inlet," Journal of Engineering for Gas Turbines and Power, July 1995, vol. 117, p 513–527. This paper shows that while evaporative cooling is extremely attractive, the economics of supercharging are not very attractive, with payback periods of over 10 years for simple cycles. Supercharging is more attractive in combined-cycle plants, but its economics are still marginal. The supercharging systems described in this paper are virtually identical to those from the 1960s, so supercharging has not advanced significantly despite decades of turbine development.

One very important problem in the prior art is that the supercharging arrangements require increasing the size of the associated generator and other auxiliary equipment. The cost of replacing the generator and other auxiliaries is so large that it effectively eliminates this possibility for existing plants. Even in new installations, supercharging may not be a practical option except at the very beginning of the project since the basic requirements of the generator, power distribution system, and associated hardware would have to change. As Kolp et al. state in their paper (page 520), "in contrast to supercharging, it is not necessary to increase the size of gas turbine plant equipment when adding evaporative cooling." Thus the conventional wisdom is that evaporative cooling may be added to an existing power plant, but supercharging is not a retrofit option.

Another method for controlling turbine capacity involves a variable-speed compressor. Relevant patents include U.S. Pat. Nos. 3,853,432 and 2,693,080. These systems give a large range of control and were usually intended for use in aircraft applications. A major problem with these systems is the cost and complexity of the variable-speed compressor. Related problems are the reliability and maintenance related to the large gearing required for these systems. These systems have not seen significant use in power-generation applications.

SUMMARY OF THE INVENTION

In accordance with one preferred embodiment of the present invention, a system for improving gas turbine capacity at high ambient air temperatures comprises at least one auxiliary fan that pressurizes turbine inlet air and a controller for limiting maximum turbine capacity to that of the turbine without supercharging. The system preferably includes an air cooler for reducing turbine inlet air temperature. The system of the invention may be added to an existing gas turbine or designed for a new, supercharged, gas turbine system.

One of the principal objectives and advantages of the invention is to increase turbine capacity at summer-peaking conditions while reducing the installed cost of the system based on capacity at summer-peaking conditions. Related objectives of the invention are to create a system that does not have excessive complexity or space requirements and that does not create unacceptable reliability or maintenance problems. An additional objective is to develop a supercharger that allows practical retrofit of existing turbines.

BRIEF DESCRIPTION OF THE DRAWINGS

FIGS. 1A–1C are schematic diagrams of one preferred embodiment of the invention that includes an air cooler downstream of an auxiliary fan that pressurizes air entering a gas turbine;

DETAILED DESCRIPTION OF THE PREFERRED EMBODIMENTS

Figure 2:
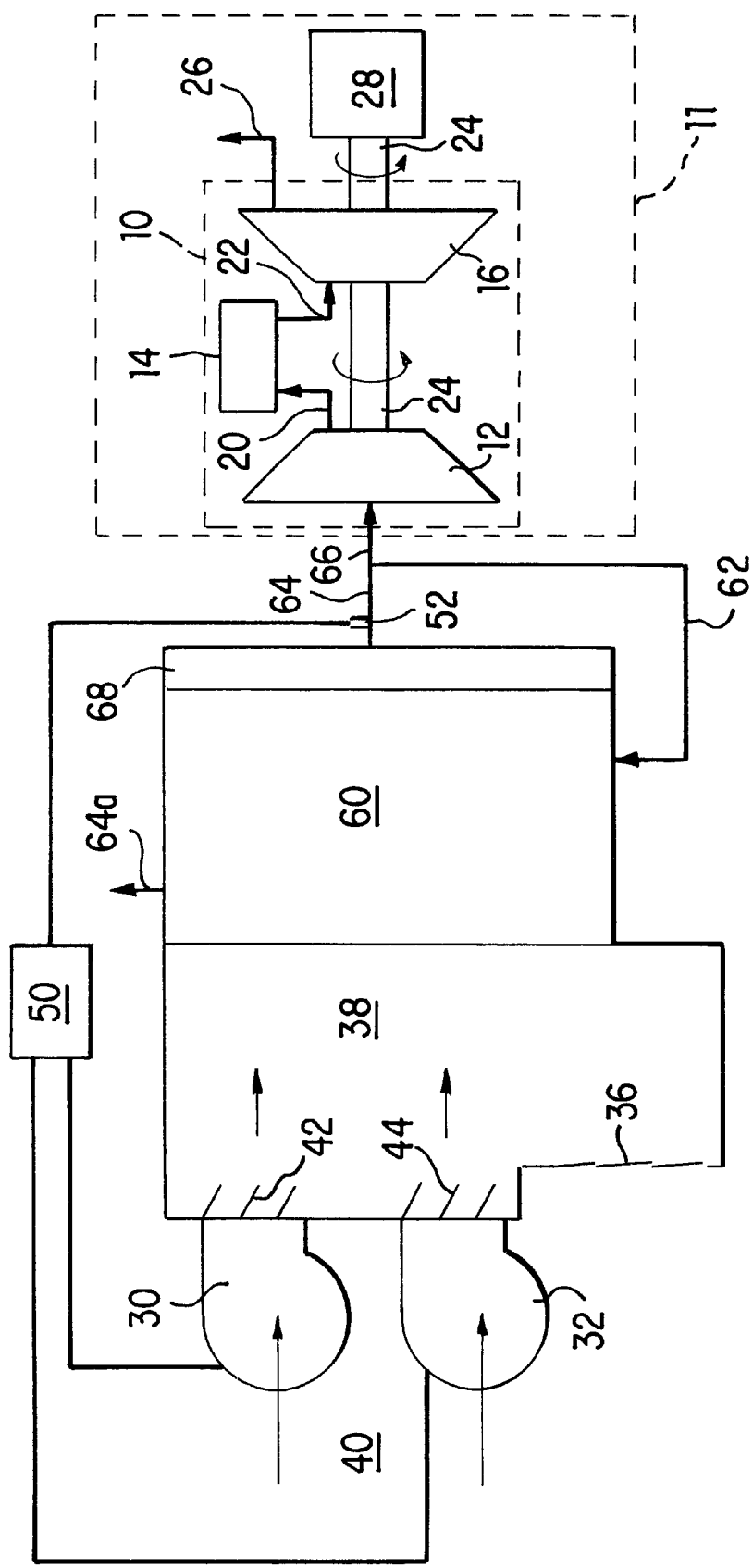
FIG. 2 shows another preferred embodiment of the invention that uses an indirect evaporative cooler.

FIG. 1A shows a first preferred embodiment of the invention. A gas-turbine power plant 11 contains a gas turbine 10 and a generator 28. Gas turbine 10 includes a compressor 12, a burner 14, and a turbine 16. The turbine 16 shares a common shaft 24 with the compressor 12 and the generator 28. The compressor 12 receives compressor inlet air stream 18 and pumps it to a higher pressure to create pressurized burner inlet air stream 20 which is supplied to burner 14. Burner 14 heats the air from stream 20 and supplies the resulting heated turbine inlet air stream 22 to the turbine 16. Turbine 16 rotates in response to the received heated inlet air stream 22, thereby rotating shaft 24 which in turn rotates generator 28 to generate electric power.

Exhaust air stream 26 exits the turbine 16. This exhaust stream 26 may go directly into the atmosphere, or it can enter a steam boiler in the case of a combined cycle plant. While FIG. 1A depicts a simple turbine arrangement for the purpose of explaining the invention, it will be recognized that more complicated arrangements, such as a dual-spool configuration, are also possible and do not change the principle of operation of the invention. Of course, the gas turbine would normally include filters, controls, safety devices, etc. as is known to those skilled in the art, and as such no illustration or detailed explanation of such components is provided or necessary for purposes of explanation of the present invention.

The inlet air stream 18 is provided to the compressor 12 as follows. A first auxiliary fan 30 and a second auxiliary fan 32 draw ambient air 40 and supply pressurized air to plenum 38. The air then goes through air cooler 34 which cools the air, forming a compressor inlet air stream 18 that enters compressor 12. The air cooler 34 is preferably a direct evaporative cooler that cools and humidifies the air stream. Examples of possible configurations for evaporative coolers are well known in the prior art. Other alternatives for the air cooler include a direct-expansion evaporator, a chilled water coil or direct-contact heat exchanger, an indirect evaporative cooler, or other device for lowering the temperature of the air stream. For the case of a chilled-water coil, cold water can be provided by a vapor-compression chiller, an absorption chiller, or from naturally occurring sources of cold water such as groundwater or bottom water from deep lakes or seas. In the case of an absorption chiller, waste heat from the turbine exhaust may be used as a heat source to drive the chiller. The air cooler is preferably located in the air stream between the auxiliary fans and the turbine, but could be located upstream of the auxiliary fans. The advantage of locating the air cooler downstream of the auxiliary fans is that it can remove any heat added by the auxiliary fans.

A bypass damper 36 allows air to enter the plenum 38 without going through the auxiliary fans when the auxiliary fans are not operating. First auxiliary fan 30 has a corresponding first damper 42 on its discharge end. Likewise second auxiliary fan 32 has a second damper 44 on its discharge end. The controller 50 receives an input control signal from sensor 52 and controls operation of auxiliary fans 30 and 32 in accordance with such signal. Possible control inputs include air stream temperature, compressor outlet pressure, generator output power, and ambient air temperature. The controller can be as simple as a thermostat; alternatively it may include computer (e.g., microprocessor) control and other associated electronics that also may control and monitor turbine performance.

Dampers 42 and 44 and bypass damper 36 act as check valves to prevent reverse air flow from the gas turbine. The dampers preferably open in response to a pressure gradient across the damper, with a gravity return to the closed position in the absence of a pressure gradient. FIGS. 1B and 1C show how the dampers operate in response to different fan operating modes. A complete description of the fan operation appears in the "Operation" section below.

The first and second auxiliary fans 30 and 32 are preferably belt-driven centrifugal fans or direct-drive axial fans. For centrifugal fans, the preferred design uses backwardly inclined airfoil blades to maximize efficiency. Fans of this type can supply a design static pressure of about 60 inches of water, which is approximately the required value for most commercial applications. Electric motors, preferably three-phase induction motors, would normally provide the power to drive the auxiliary fans, although engines or mechanical connection to the turbine itself are possible alternatives.

While FIGS. 1A–1C show two auxiliary fans, three or more auxiliary fans can be used, or even a single auxiliary fan may be used. Multiple auxiliary fans allow for staging of fans to adjust turbine inlet pressure in increments. A single auxiliary fan does not have this control option.

In the preferred embodiment, the two auxiliary fans have approximately equal pressure capability, but are of unequal flow sizing. The lead auxiliary fan has a larger flow capacity and preferably operates at a fixed speed to reduce cost. The lag auxiliary fan has variable flow capacity and adjusts turbine inlet pressure as is described in detail in the "Operation" section below. Variable-speed drives or, in the case of axial fans, variable-pitch blades are the preferred methods for adjusting auxiliary fan flow. Inlet vanes are another alternative, but not preferred because of their relatively poor efficiency.

FIG. 2 shows a first alternative embodiment that uses an indirect evaporative cooler that can approach the ambient dewpoint temperature. The configuration is similar to that of FIG. 1 except that an indirect evaporative cooler 60 is located in the air stream between the plenum 38 and the gas turbine 10. As with the previous embodiment, the gas turbine 10 and generator 28 form a gas-turbine power plant 11. Likewise the gas turbine 10 comprises a compressor 12, a burner 14, and a turbine 16. The indirect evaporative cooler 60 uses a secondary air stream 62 which is taken from a portion of the primary air stream 64 that exits from an optional direct evaporative cooler 68 located between the indirect evaporative cooler 60 and the turbine 10 to optionally further cool the air entering the turbine. A turbine inlet air stream 66 is formed by the remaining portion of the primary air stream 64 and enters turbine 10. The air from the secondary air stream 62 is indirectly heated and humidified by the air flow from plenum 38 inside the indirect evaporative cooler 60 and exits as exhaust air stream 64a.

Figure 3:
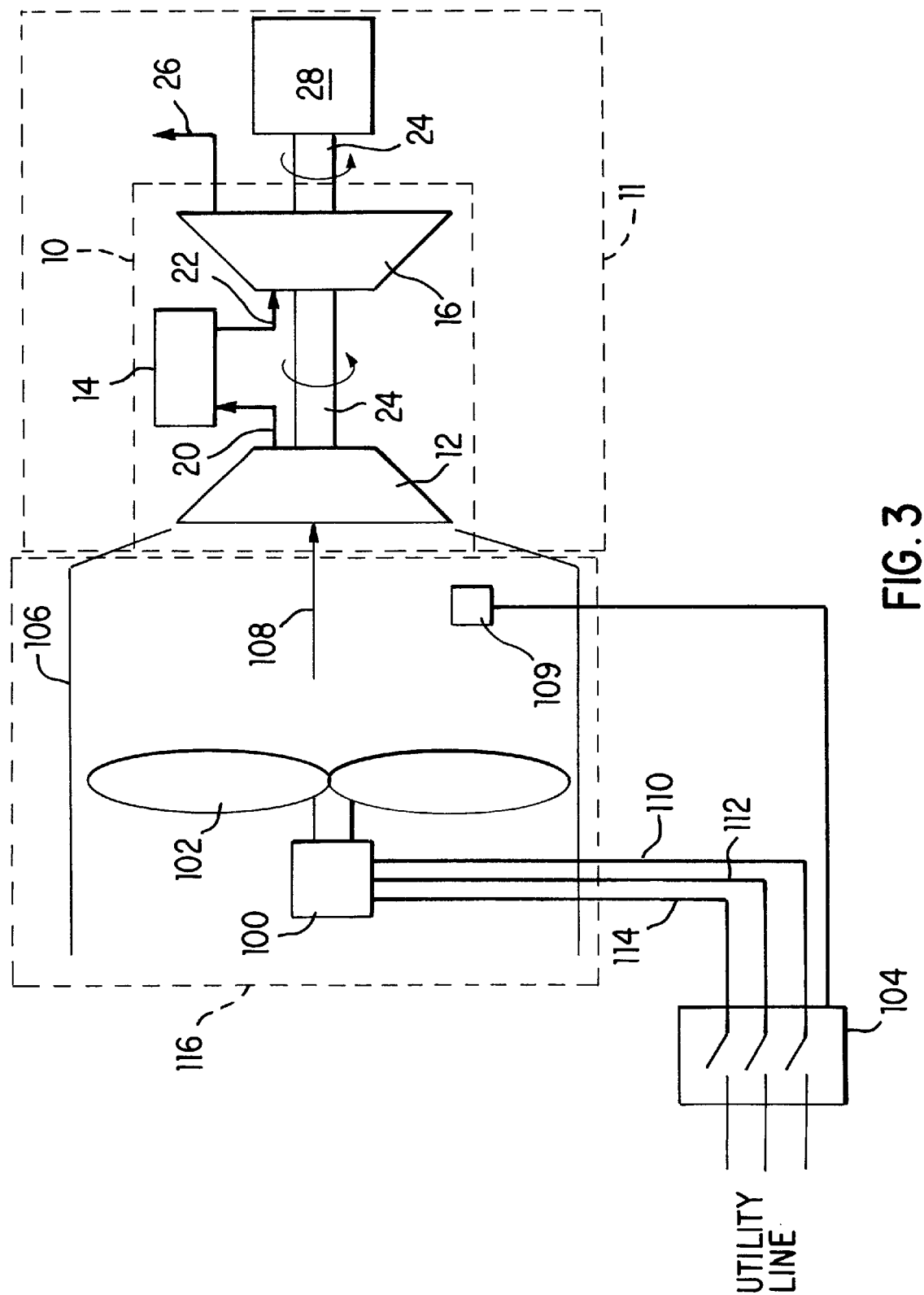
FIG. 3 shows a first alternate embodiment of the invention that uses an axial-flow fan.

FIG. 3 shows a second alternative embodiment that uses a motor-driven axial-flow auxiliary fan. An auxiliary fan 116 includes a motor 100 that drives impeller 102, both of which are contained inside housing 106. The motor 100 is preferably a three-phase induction motor and is connected to a utility power line by conductors 110, 112, and 114 through switching contactor 104. When the contactor 104 closes, the motor 100 is energized, driving impeller 102 which increases the pressure of discharge air stream 108 that enters turbine 10. When the contactor 104 is open, the motor 100 is de-energized and the impeller 102 is driven solely by the air stream 108, thus acting as a pressure reducer which reduces the pressure of air stream 108.

The contactor 104 may be a simple manually operated device in which case an operator will determine when extra turbine capacity is appropriate and close the switch to operate the auxiliary fan. The preferred arrangement includes a thermostat 109, preferably located in contact with the air stream 108, which controls the contactor 104 and allows the auxiliary fan 116 to operate when the temperature of the air stream 108 exceeds a predetermined value. Thermostat 109 thus functions to limit turbine output power to prevent overloading the gas-turbine power plant 11. Of course, much more sophisticated controls are possible. For example, the auxiliary fan can have variable-pitch blades which are adjusted by a controller that senses pressure and temperature conditions to maximize turbine output. Very sophisticated control is currently possible with microprocessor-based systems.

Additional mechanical hardware can be added to improve performance. A bypass damper can reduce the pressure drop through the auxiliary fan when it is not energized. A direct evaporative cooler or other cooling means could be added to reduce turbine inlet temperatures. An advantage of the system in FIG. 3 is its low cost and simplicity, which are especially important in small turbines. The optimum configuration requires careful evaluation of the commercial application. While not preferred, the switch 104 may be eliminated in special applications. For example, if a turbine is moved from a cold climate to a tropical climate, it may be desirable to add an auxiliary fan that runs continuously whenever the turbine is running. The addition of the auxiliary fan would effectively adjust the design conditions of the turbine to match the higher ambient temperatures.

Another option, though not preferred, is to drive the auxiliary fan directly from the turbine. The simplest configuration is a direct mechanical connection by way of a shaft that is attached to the turbine. However, normally this arrangement would require a reduction gear to allow the auxiliary fan to run at a speed that is much slower than that of the turbine. An eddy current clutch or mechanical clutch can be used to allow changes in fan speed. Another option is to use a differential gearing to a brake, a generator, or other reactor to reduce the speed of the fan by controlling the speed of a second shaft. These arrangements would be difficult or impossible to retrofit on existing turbines. The gearing and other mechanical components necessary for this approach also require regular maintenance. As such, this embodiment may not be as reliable as others.

Figure 4:
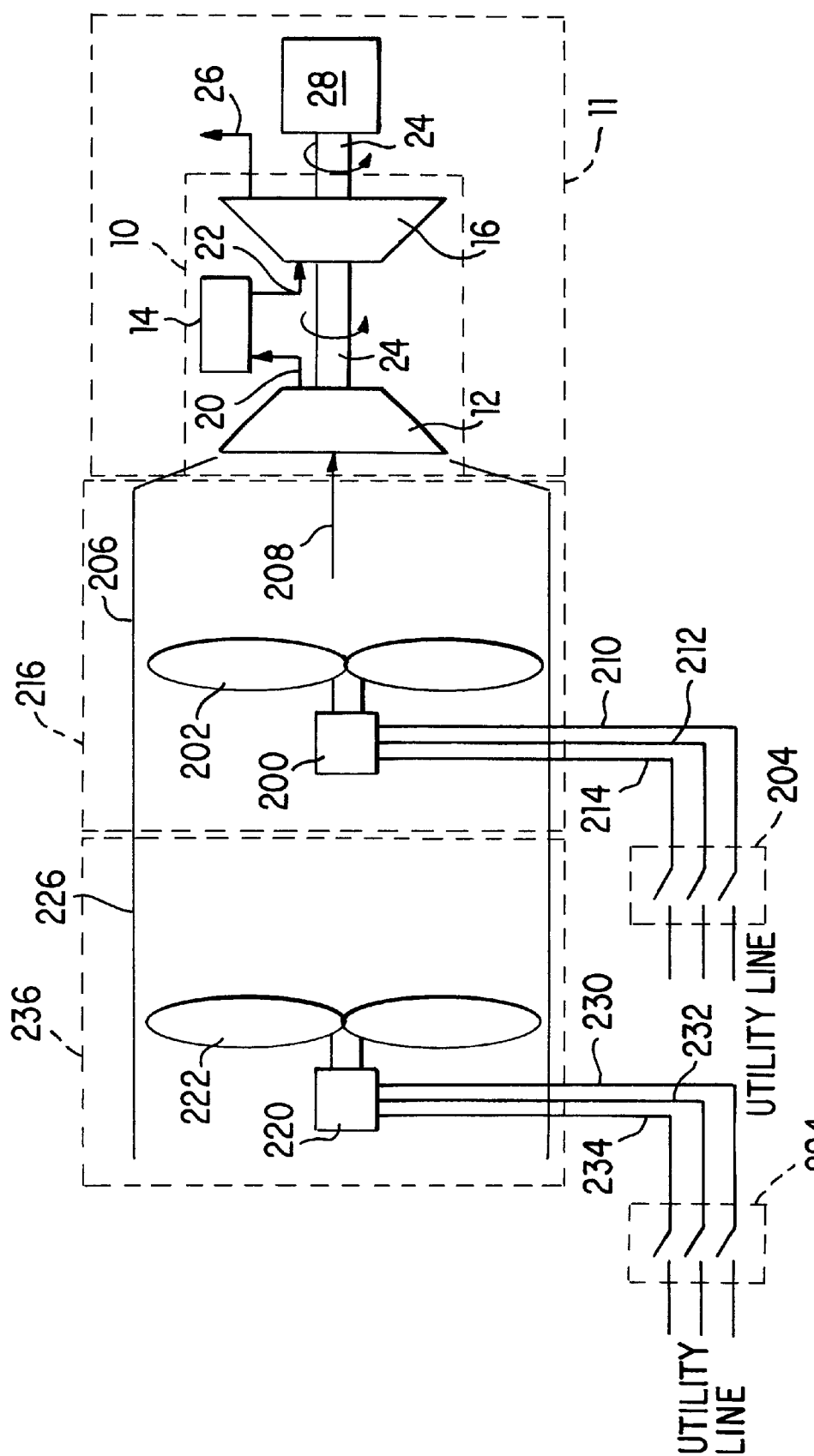
FIG. 4 shows another alternate embodiment of the invention that uses series fans.

FIG. 4 shows an additional alternative embodiment with two auxiliary fans in a series configuration. A first auxiliary fan 216 includes a first impeller 202 and a first motor 200 in a first housing 206. The first fan is located in an inlet air stream 208 which enters compressor 12. Conductors 210, 212, and 214 connect the first motor 200 through switch 204 to the utility power line. A second fan 236 is located upstream of the first fan 216. The second fan comprises a second impeller 222 and a second motor 220 in a second housing 226. The second motor 220 is connected through switch 224 and conductors 230, 232, and 234 to a utility power line.

OPERATION

Figure 5:
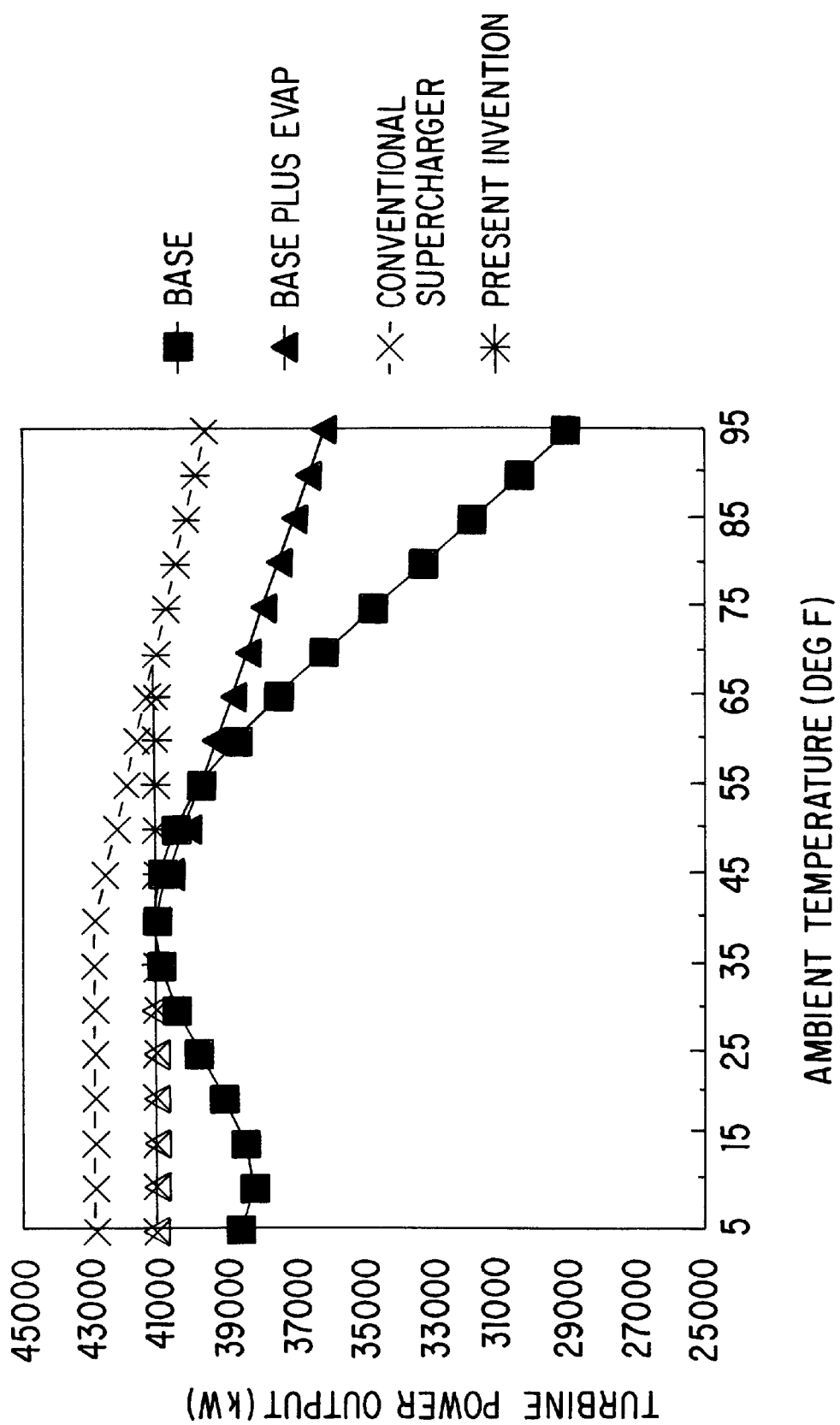
FIG. 5 is a graph that shows how turbine capacity varies with ambient temperature.

FIG. 5 shows how the new system can increase peak capacity of an existing gas-turbine power plant. This figure is based on published performance data for a General Electric LM6000 gas turbine, but the basic analysis is valid for any gas turbine. The base system without any supercharging or inlet cooling has a peak power output around an ambient temperature of 40° F. and performance drops rapidly at higher temperatures. Conventional evaporative inlet cooling helps the performance of the turbine at higher ambient temperatures without increasing the maximum output power at 40° F. A conventional supercharger, which includes an evaporative cooler, further increases turbine output power at all ambient temperatures, which would undesirably overload the gas-turbine power plant at lower ambient temperatures.

The present invention limits turbine output to allow the benefits of supercharging at high ambient temperatures without overloading the power plant at low temperatures. This new feature results in a power output that varies very little with ambient temperature changes.

Table 1 shows a cost comparison (adapted from Kolp et al.) for the supercharger of the present invention compared to conventional systems. This table shows that adding the new supercharger is less than half of the cost of adding peaking turbine capacity. The incremental cost per kW for adding the supercharger to a system with an evaporative cooler is about $300 per kW, while the cost of a new peaking turbine power plant is $700 per kW. The combination of an evaporative cooler and the supercharger increases turbine capacity at summer-peaking conditions by over 30%. The controls in the present invention eliminate the need for the bigger generator and related hardware, since the peak power output of the turbine at low ambient temperatures is unchanged. This analysis shows that the present invention has a significant advantage in new installations. In retrofit situations the cost of adding a conventional supercharger would be at least an order of magnitude larger since it would require replacement of the generator and related equipment in order to handle the increased output at low-ambient-temperature conditions.

TABLE 1

Cost comparison

| | Incremental Cost | kW at Peak | Incremental Peak kW | Incremental Cost per kW |
| --- | --- | --- | --- | --- |
| Peaking Turbine: | | | | |
| Base | $21,260,400 | 30,372 | 30,372 | $700 |
| plus evaporative cooler | $220,000 | 36,180 | 5,808 | $38 |
| plus supercharger | $1,386,000 | 40,749 | 4,569 | $303 |
| plus bigger | $580,550 | 40,749 | 0 | infinite |

TABLE 1-continued

Cost comparison

| | Incremental Cost | kW at Peak | Incremental Peak kW | Incremental Cost per kW |
|---|---|---|---|---|
| generator, etc. Combined Cycle Plant: | | | | |
| Base | $38,885,000 | 38,885 | 38,885 | $1,000 |
| plus evaporative cooler | $220,000 | 47,415 | 8,530 | $26 |
| plus supercharger | $1,386,000 | 53,183 | 5,768 | $240 |
| plus bigger generator, etc. | $1,796,238 | 53,183 | 0 | infinite |

Table 2 shows how adding an auxiliary fan can improve power plant performance. For the example in the table, an auxiliary fan would increase the turbine output by just over 4 MW while consuming only 1.24 MW of power. The result is an increase in net power output of almost 2.8 MW. This simple analysis shows that an auxiliary fan can significantly improve peak power output for gas turbines.

TABLE 2

Power Comparison for a 100-MW plant

| | Base | Cooler Only | Aux. Fan Only | Aux. Fan and Cooler |
|---|---|---|---|---|
| Inlet static pressure change (inches of water) | 0 | −0.5 | 10 | 9.5 |
| Inlet temp. ° F. | 95 | 77 | 99.9 | 78.7 |
| Temperature change effect on turbine output(MW) | 0 | 7.20 | −1.96 | 6.5 |
| Static pressure effect on turbine output | 0 | −0.30 | 6.00 | 5.70 |
| Aux. Fan Power(MW) | 0 | 0.00 | −1.24 | −1.24 |
| Net change in turbine power output (MW) | 0 | 6.90 | 2.80 | 10.96 |

(Assumptions: 8 CFM/kW, 95° F. DB, 75° F. WB, 80% fan efficiency, 95% efficient fan motor, 0.4% change in kW/(F, 0.6% change in kW/inch H2O, 90% cooler effectiveness.)

This table also shows that the combination of an auxiliary fan and an evaporative cooler work synergistically to increase turbine power output. As stated before, adding the auxiliary fan to the turbine without a cooling mechanism would increase power output by 2.80 MW. On the other hand, adding the same fan to a turbine with a direct evaporative cooler adds 4.06 MW of capacity. The effect of the auxiliary fan is thus almost 50% greater with the cooler than without the cooler. This analysis shows that the effect of the combination is greater than the sum of the parts and thus is especially desirable.

Figure 6B:
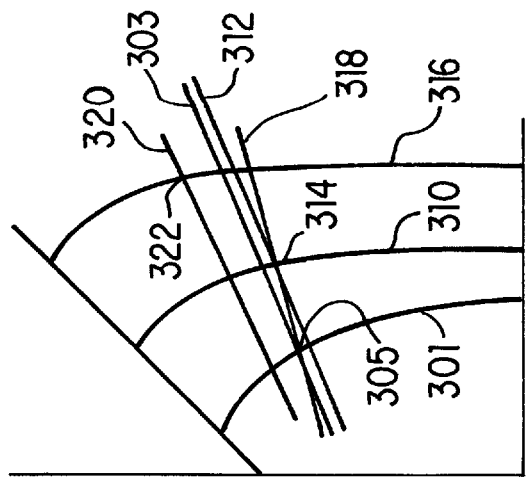
FIGS. 6A and 6B are schematic compressor maps that show the principles of operation of the system according to the invention.
Figure 6A:
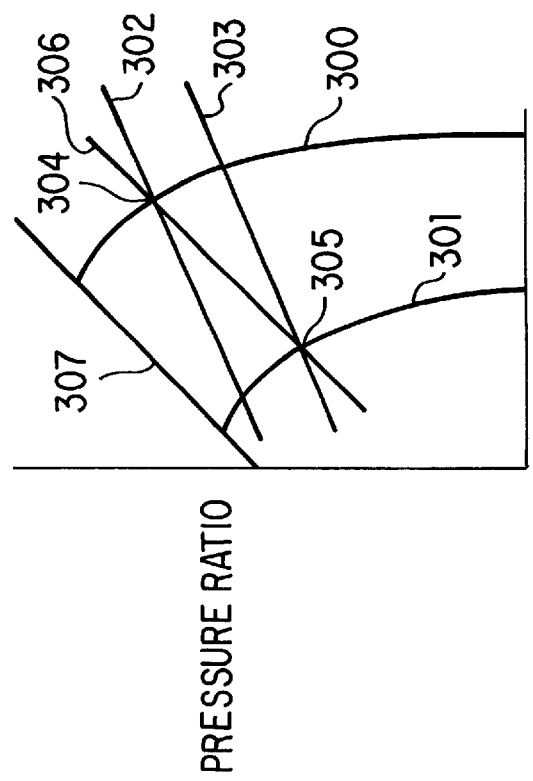

FIGS. 6A and 6B are compressor maps showing how the system of the present invention improves turbine capacity. The vertical axis is turbine pressure ratio, which is the turbine inlet pressure divided by the atmospheric pressure. The horizontal axis is mass flow parameter which is given by the equation:

$$\text{mass flow parameter} = \frac{m\sqrt{\theta}}{\delta}$$

where:
   m is the turbine mass flow rate,
   $\delta$ is the compressor inlet pressure divided by the standard atmospheric pressure, and
   $\theta$ is the compressor inlet absolute temperature divided by design absolute temperature.

The pressure ratio is the compressor discharge pressure divided by the atmospheric pressure. For the purposes of this analysis, the effect of burner pressure drop and other minor factors are lumped with the compressor and turbine performance. For background information in component matching see Blathe, *Fundamentals of Gas Turbines*, chapter 10.

Compressor curve 300 shows the performance of the compressor at design conditions, while compressor curve 301 shows the performance at peak inlet temperature. Turbine line 302 shows the performance of the turbine at design conditions and turbine line 303 represents the turbine performance at peak inlet temperature. The intersection of compressor curve 300 and turbine line 302 define the design operating point 304. The intersection of the compressor curve 301 and turbine line 303 is operating point 305 at the peak inlet temperature. The operating line 306 shows possible turbine operating points at different inlet temperatures. Surge line 307 is the limit of stable operation for the compressor.

At operating point 305, the turbine capacity is significantly reduced from that at the design operating point 304. The higher inlet temperature increases the speed of sound of the air, which reduces the compressor Mach number and moves the compressor curve to the left as shown in the figure. In addition, the higher temperature reduces air density which further reduces mass flow rate. These changes reduce the compressor pressure ratio and mass flow rate, which reduces the energy available for driving the turbine. Cooling the air can restore the turbine capacity.

FIG. 6B shows how the new system can improve turbine capacity at peak ambient temperatures. Pressurizing the air entering the compressor increases the turbine pressure ratio and compressor inlet temperature to create a compressor curve 310. A new turbine line 312 reflects the slightly higher temperature. The intersection of the turbine line 312 and the compressor curve 310 define an operating point 314. This operating point corresponds to the operation with an auxiliary fan and no inlet cooling. Operating line 318 shows possible operating conditions with different operating pressures. An additional benefit of higher pressure air is increased air density, which further enhances the capacity improvement.

Another compressor curve 316 and a turbine line 320 correspond to a lower compressor inlet temperature that can be achieved using an evaporative cooler. An operating point 322 at the intersection of the compressor curve 316 and turbine line 320 corresponds to an operating condition an auxiliary fan and inlet cooling. This analysis shows that it is possible to approximate the original design capacity of a gas turbine through a combination of inlet cooling and pressurization. The ultimate limits of the turbine capacity are the operating pressures and power output that are acceptable for the turbine, generator, etc. These factors would normally prevent the auxiliary fan and inlet cooling from creating a turbine output that is significant above the turbine design output.

FIGS. 1A, 1B, and 1C show a system that operates with two auxiliary fans in parallel. In FIG. 1A both the first and second auxiliary fans 30 and 32 are operating and the bypass damper 36 closes to prevent backward flow away from the turbine. First and second damper 42 and 44 are both open to allow air flow from the fans.

FIG. 1B shows operation with the first auxiliary fan 30 off and the second auxiliary fan 32 on. The bypass damper 36 is again closed. The second damper 44 remains open, while the first damper 42 closes. In FIG. 1C, both auxiliary fans 30 and 32 are off and their corresponding dampers 42 and 44 are closed. The bypass damper 36 opens to allow air to go around the auxiliary fans 30 and 32.

Figure 7A:
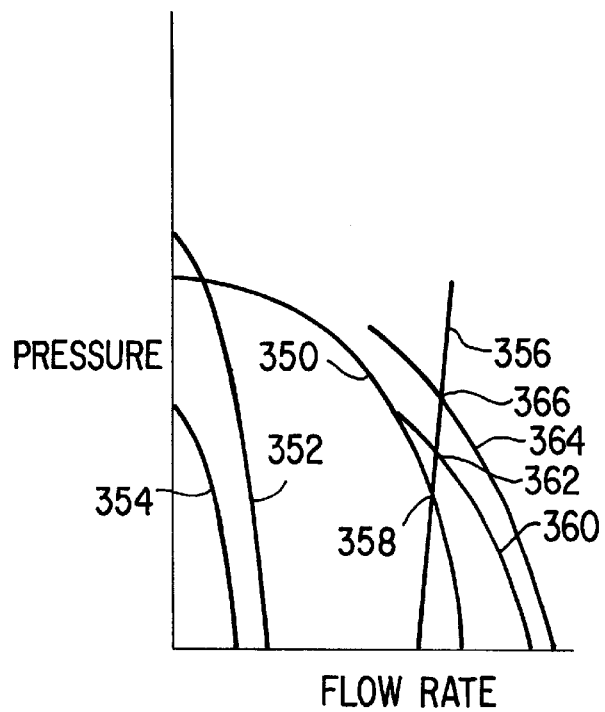
FIGS. 7A and 7B are fan curves that show how multiple fans can be used to vary inlet pressure to a gas turbine.

FIG. 7A plots fan curves showing how parallel auxiliary fans can work together to create a range of turbine inlet pressures. For parallel operation, the pressure across the two fans is the same and the flows add together. A lead fan curve 350 is for the lead fan. The gas turbine line 356 is nearly vertical since the flow through the turbine varies only slightly with inlet pressure. The operating point 358 is at the intersection of the lead fan curve 350 and the turbine line 356. This operating point 358 corresponds to operation with one fan.

A first lag fan curve 352 corresponds the performance of the lag fan at full speed. Running both fans together corresponds to fan curve 364. The intersection of the fan curve 364 and the turbine line is an operating point 366 that corresponds to operation with both fans. A second lag fun curve 354 represents fan performance at low speed, and fan curve 360 represents the corresponding two fan operation. An operating point 362 represents the operating condition with both fans operating and the lag fan at low speed.

Figure 7B:
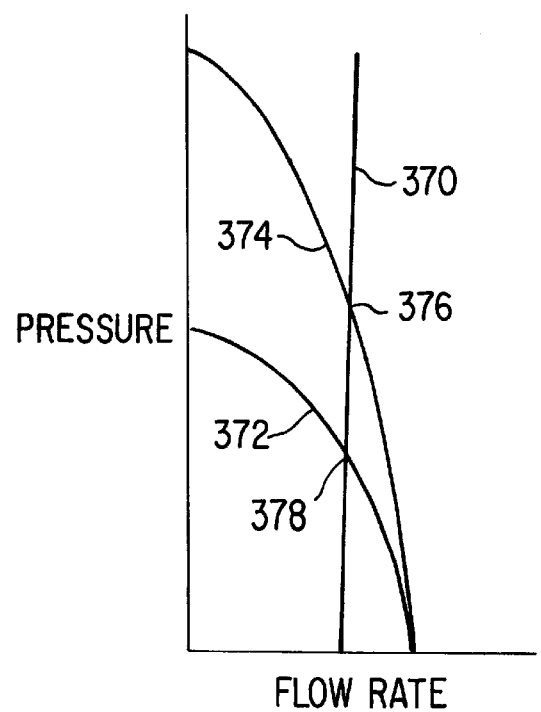

FIG. 7B shows operation with two similar fans in series. Fan curve 372 corresponds to operation with only one fan. The intersection of the fan curve and the turbine line 370 represents operation point 378 for one fan. Fan curve 374 corresponds to both fans running. Operating point 376 represents turbine operation with both fans running.

Figure 8:
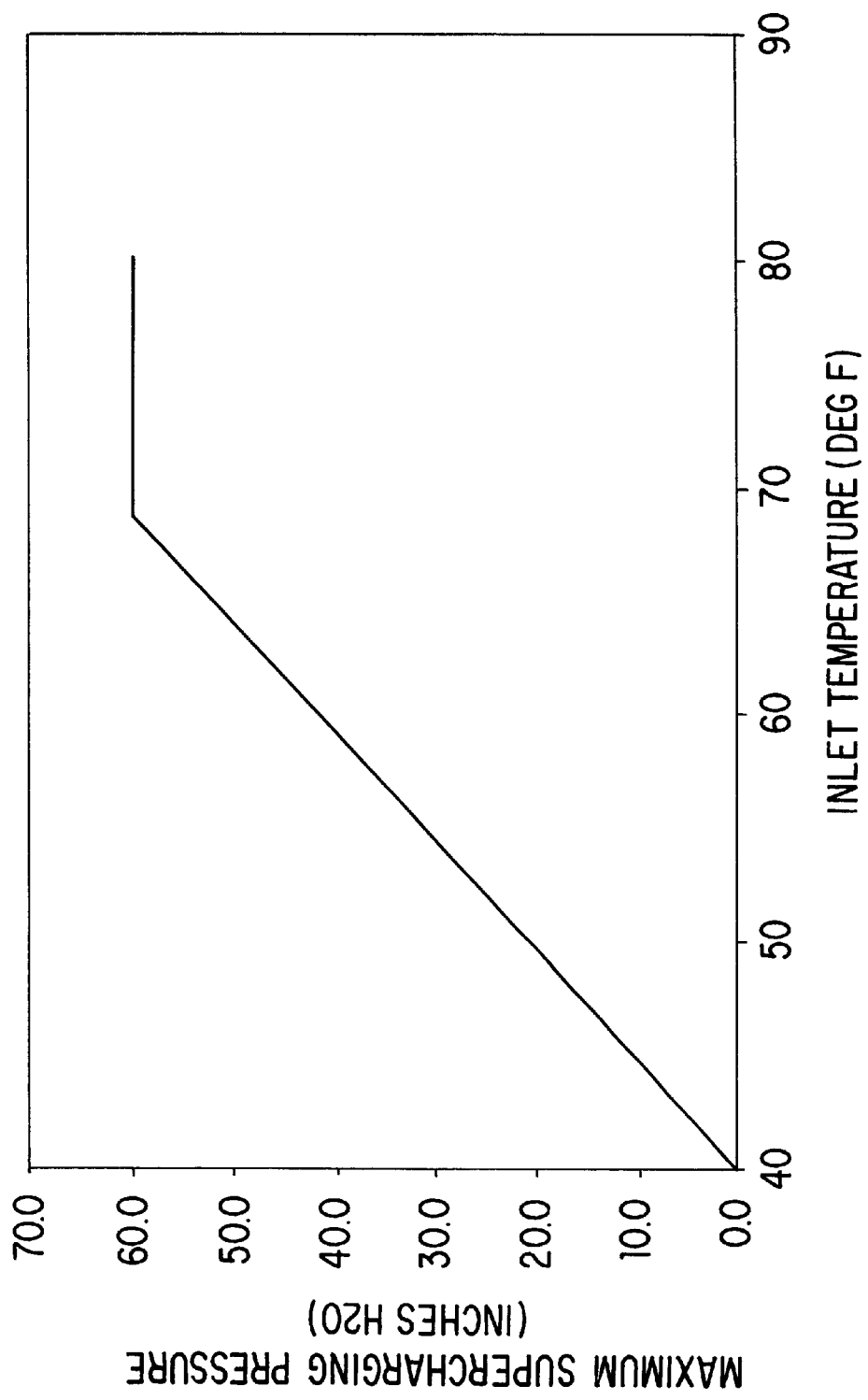
FIG. 8 is a graph of maximum supercharging pressure versus turbine inlet air temperature.

FIG. 8 shows a simple relation between maximum supercharging pressure and inlet temperature that may be used to control the supercharger. The controller can use the temperature entering the compressor to adjust the supercharger pressure. The result is a very simple control system for maximizing turbine performance. This approach may be very useful in controlling a supercharger in retrofit situations since it would require little or no changes to existing controls for the gas-turbine power plant.

The advantages of the supercharging system for gas turbines are significant and numerous. Among the most important ones are:

Large increase in turbine capacity at high ambient temperatures

Ability to achieve a large capacity increase even in humid climates

Low installed cost

Simple design

Compact design

Flexible control possible

Can be retrofitted on existing gas turbines

Bypass damper allows turbine operation without auxiliary fan

Multiple fans and dampers provide redundancy for reliable operation, and

Blower and cooling means work synergistically to give large capacity improvement.

Overall this system represents a major breakthrough in gas-turbine technology. Its simplicity and low-cost make it extremely desirable for power-generation applications that now face major performance penalties at high ambient temperatures. The invention having been thus described, it will become apparent to those skilled in the art that the same may be varied in many ways without departing from the spirit and scope of the invention. Any and all such modifications are intended to be covered within the scope of the following claims.

What is claimed is:

1. A supercharger for increasing the power output at high ambient temperatures of a gas-turbine power plant including a generator, comprising:

at least one auxiliary fan located upstream of said power plant for increasing the pressure of inlet air fed to said power plant at high ambient temperatures; and a controller for controlling the operation of said auxiliary fan such that the power output of the power plant, including said generator, does not exceed its maximum unsupercharged design output with respect to said generator.

2. The supercharger of claim 1, wherein said auxiliary fan raises the pressure of air entering the compressor, thereby increasing the power output of the power plant.

3. The supercharger of claim 1, further comprising an air cooler that is located in the air stream upstream of the compressor and downstream of said auxiliary fan.

4. The supercharger of claim 3, wherein the air cooler cools the air stream, thereby increasing the power output of the power plant.

5. The supercharger of claim 4, wherein said air cooler comprises a direct evaporative cooler.

6. The supercharger of claim 4, wherein said air cooler comprises an indirect evaporative cooler.

7. The supercharger of claim 6 further comprising a direct evaporative cooler located in the air stream between said indirect evaporative cooler and the compressor inlet.

8. The supercharger of claim 2, wherein said controller limits power output of the turbine by controlling the speed of said auxiliary fan.

9. The supercharger of claim 4, wherein said controller limits power output of the turbine by controlling the operation of said air cooler.

10. The supercharger of claim 1, further comprising a bypass damper that allows air to bypass said auxiliary fan when said auxiliary fan is not operating.

11. The supercharger of claim 1, wherein said supercharger is retrofitted to an existing gas-turbine power plant that did not previously include a supercharger.

12. A gas-turbine power plant, comprising:

a compressor for compressing inlet air to a high pressure;

a burner that receives compressed air from the compressor and heats said compressed air;

a turbine that expands the compressed, heated air from the burner, producing rotational force;

a shaft which is driven by the turbine, driving the compressor;

an electric generator, driven by the shaft, which produces electricity when driven;

at least one auxiliary fan located upstream of said compressor for increasing the pressure of inlet air fed to said compressor at high ambient temperatures; and a controller for controlling the operation of said auxiliary fan such that the power output of the power plant, including said generator, does not exceed its maximum unsupercharged design output with respect to said generator.

13. The power plant of claim 12, wherein said auxiliary fan raises the pressure of air entering the compressor, thereby increasing the power output of the power plant.

14. The power plant of claim 12, further comprising an air cooler that is located in the air stream upstream of the compressor and downstream of said auxiliary fan.

15. The power plant of claim 14, wherein the air cooler cools the air stream, thereby increasing the power output of the power plant.

16. The power plant of claim 14, wherein said air cooler comprises a direct evaporative cooler.

17. The power plant of claim 14, wherein said air cooler comprises an indirect evaporative cooler.

18. The power plant of claim 17 further comprising a direct evaporative cooler located in the air stream between said indirect evaporative cooler and the compressor inlet.

19. The power plant of claim 12, wherein said controller limits power output of the turbine by controlling said auxiliary fan.

20. The power plant of claim 14, wherein said controller limits power output of the turbine by controlling said air cooler.

21. The power plant of claim 12, further comprising a bypass damper that allows air to bypass said auxiliary fan when said auxiliary fan is not operating.

22. The power plant of claim 12, wherein said auxiliary fan is retrofitted to said gas-turbine power plant, the components of which other than said auxiliary fan being previously designed to achieve a maximum power output without supercharging by said auxiliary fan.

23. A method for increasing power output of a gas-turbine power plant including a generator, by adding a supercharger, comprising the steps of:

locating at least one auxiliary fan upstream of said power plant for increasing the pressure of inlet air fed to said power plant at high ambient temperatures; and providing a controller for controlling the operation of said at least one auxiliary fan, such that said controller does not allow power output of the power plant, including said generator, to exceed its maximum unsupercharged design output with respect to said generator.

24. The method of improving power output of a gas-turbine power plant of claim 23 further comprising the step of deploying an air cooler upstream of the compressor and downstream of said auxiliary fan.

* * * * *